(12) United States Patent
Okazaki et al.

(10) Patent No.: US 9,965,283 B2
(45) Date of Patent: May 8, 2018

(54) MULTI-THREADED PROCESSOR INTERRUPTING AND SAVING EXECUTION STATES OF COMPLEX INSTRUCTIONS OF A FIRST THREAD TO ALLOW EXECUTION OF AN OLDEST READY INSTRUCTION OF A SECOND THREAD

(71) Applicant: FUJITSU LIMITED, Kawasaki-shi, Kanagawa (JP)

(72) Inventors: Ryohei Okazaki, Kawasaki (JP); Yasunobu Akizuki, Kawasaki (JP); Takekazu Tabata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 15/068,692

(22) Filed: Mar. 14, 2016

(65) Prior Publication Data
US 2016/0342415 A1    Nov. 24, 2016

(30) Foreign Application Priority Data

May 22, 2015  (JP) .................................. 2015-104724

(51) Int. Cl.
*G06F 9/38*    (2018.01)

(52) U.S. Cl.
CPC .......... *G06F 9/3836* (2013.01); *G06F 9/3838* (2013.01); *G06F 9/3851* (2013.01); *G06F 9/3869* (2013.01)

(58) Field of Classification Search
CPC ............................ G06F 9/3838; G06F 9/3851
See application file for complete search history.

(56) References Cited

U.S. PATENT DOCUMENTS

| | | | |
|---|---|---|---|
| 6,237,081 B1* | 5/2001 | Le | G06F 9/3836 712/205 |
| 6,567,839 B1 | 5/2003 | Borkenhagen et al. | |
| 2010/0095092 A1* | 4/2010 | Akizuki | G06F 9/3836 712/208 |
| 2010/0095103 A1* | 4/2010 | Akizuki | G06F 9/30123 712/234 |
| 2014/0181484 A1* | 6/2014 | Callister | G06F 9/3851 712/229 |
| 2016/0011874 A1* | 1/2016 | Orenstein | G06F 9/3806 712/208 |

FOREIGN PATENT DOCUMENTS

| | | |
|---|---|---|
| JP | 2001-521216 | 11/2001 |
| WO | 99/21083 | 4/1999 |

* cited by examiner

*Primary Examiner* — Jacob A Petranek
(74) *Attorney, Agent, or Firm* — Fujitsu Patent Center

(57) ABSTRACT

A first entry, when outputting an instruction stored in the first entry to a first arithmetic unit and when an execution cycle number of the instruction stored in the first entry is equal to or more than a threshold value, outputs a use inability signal of the first arithmetic unit to a second entry, a reservation station includes a controller configured to, when the use inability signal of the first arithmetic unit is output and then a use inability discontinuation condition is satisfied, perform control to discontinue execution of the first arithmetic unit, store a state of the first arithmetic unit in a storage element, and discontinue output of the use inability signal of the first arithmetic unit, and the second entry, when output of the use inability signal of the first arithmetic unit is discontinued, outputs an instruction stored in the second entry to the first arithmetic unit.

10 Claims, 7 Drawing Sheets

F I G. 1
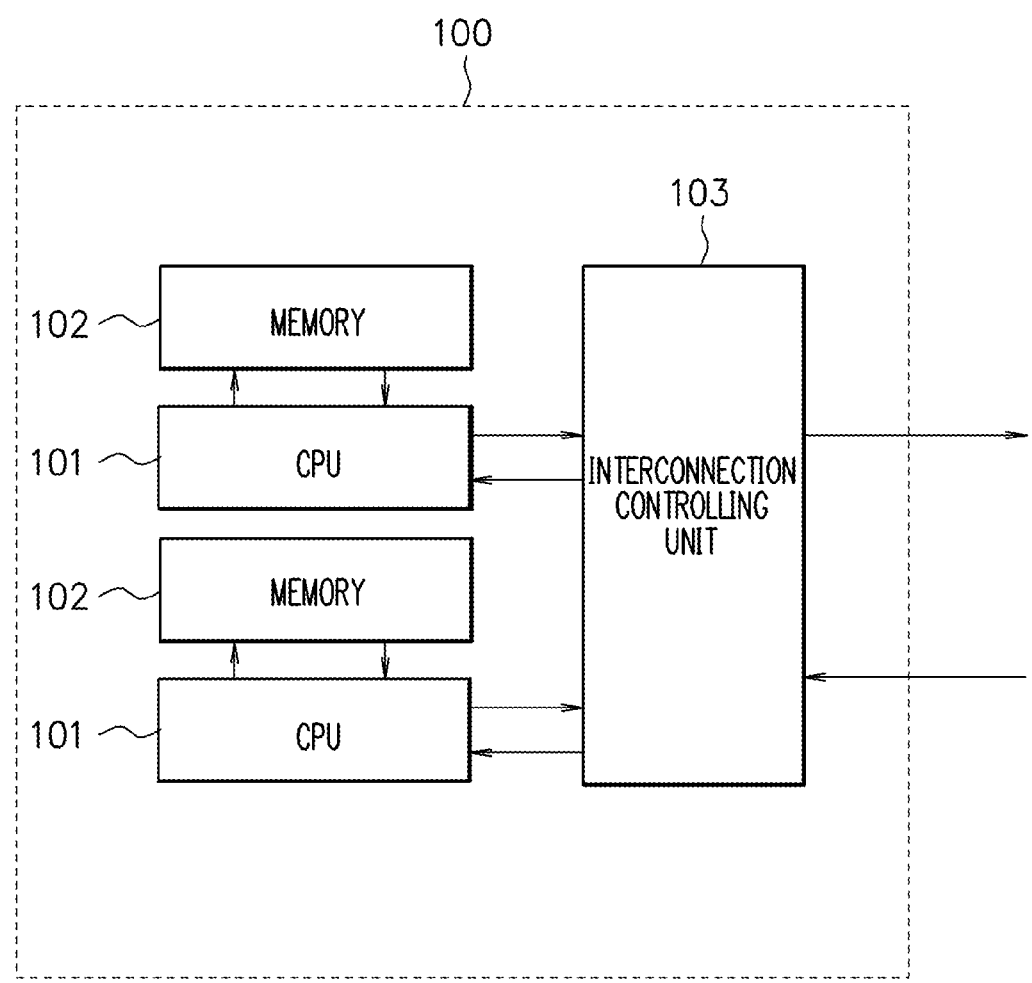

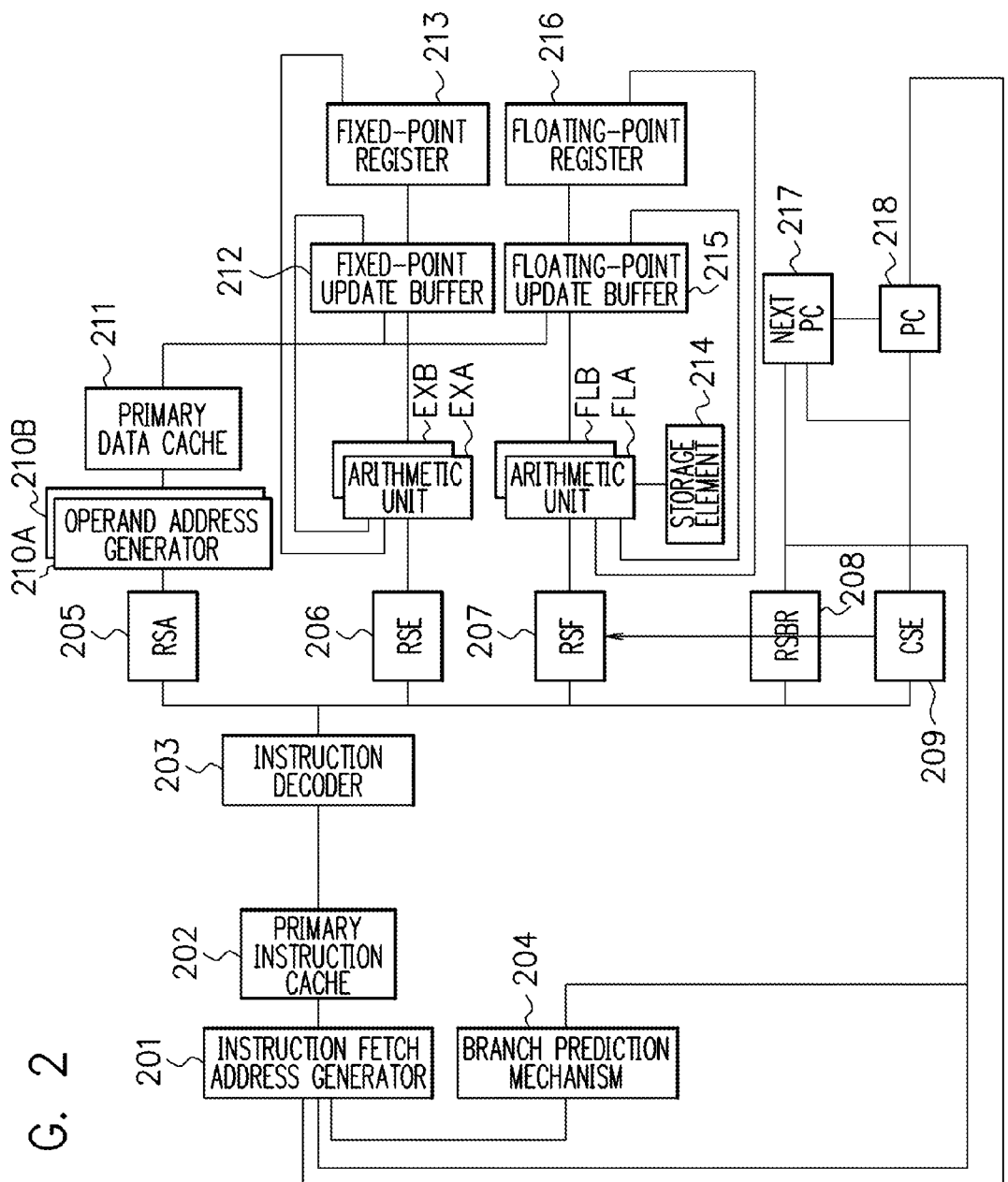
F I G. 2

MULTI-THREADED PROCESSOR INTERRUPTING AND SAVING EXECUTION STATES OF COMPLEX INSTRUCTIONS OF A FIRST THREAD TO ALLOW EXECUTION OF AN OLDEST READY INSTRUCTION OF A SECOND THREAD

CROSS-REFERENCE TO RELATED APPLICATION

This application is based upon and claims the benefit of priority of the prior Japanese Patent Application No. 2015-104724, filed on May 22, 2015, the entire contents of which are incorporated herein by reference.

FIELD

The embodiment discussed herein is directed to an arithmetic processing device and a processing method of an arithmetic processing device.

BACKGROUND

There has been disclosed a processing method of a computer employing a multithreaded processor (see Patent Document 1). An active thread state where a thread is activated is stored in at least one hardware register. A background thread state expressing an execution situation of at least one background thread is stored in the at least one hardware register. In the multithreaded processor, at least one active thread is executed. An active thread state of the above-described at least one active thread is replaced with a subsequent state generated by executing the above-described at least one active thread in the multithreaded processor. The replaced active thread state of the active thread is compared with a background thread state of at least one background thread. This determines whether the replacement of the active thread state of the at least one active thread with the subsequent state causes the multithreaded processor to switch execution to the at least one background thread.

[Patent Document 1] Japanese Translation of PCT Application No. 2001-521216

A single arithmetic unit can execute instructions of a plurality of threads. However, when an execution cycle number of an instruction of a single thread among a plurality of threads is long, the instruction of the single thread uses a single arithmetic unit exclusively. In this case, instructions of the other threads turn to a standby state for a long time and quality of service (QoS: Quality of Service) of the other threads decreases significantly.

SUMMARY

An arithmetic processing device is an arithmetic processing device configured to execute instructions of a plurality of threads, the arithmetic processing device including: an instruction decoder configured to decode an instruction, to thereby output the decoded instruction and an identifier of a thread corresponding to the decoded instruction; a reservation station configured to include a plurality of entries and store the instruction decoded by the instruction decoder and the identifier of the thread corresponding to the decoded instruction in one of the plurality of entries; and a first arithmetic unit configured to execute an instruction stored in the reservation station, in which a first entry among the plurality of entries, when outputting an instruction stored in the first entry to the first arithmetic unit and when an execution cycle number of the instruction stored in the first entry is equal to or more than a threshold value, outputs a use inability signal of the first arithmetic unit to a second entry different from the first entry, the reservation station includes a controller configured to, when the use inability signal of the first arithmetic unit is output and then a use inability discontinuation condition is satisfied, perform control to discontinue execution of the first arithmetic unit, store a state of the first arithmetic unit in a storage element, and discontinue output of the use inability signal of the first arithmetic unit, the second entry, when an identifier of a thread stored in the second entry is different from the identifier of the thread stored in the first entry, an instruction stored in the second entry is the oldest uncompleted instruction in the reservation station, and output of the use inability signal of the first arithmetic unit is discontinued, outputs the instruction stored in the second entry to the first arithmetic unit, and the first arithmetic unit, when completing execution of the instruction output from the second entry, returns to a state stored in the storage element and restarts execution of the instruction of the first entry.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of an arithmetic processing system according to this embodiment;

FIG. 2 is a diagram illustrating a configuration example of a central processing unit in FIG. 1;

DESCRIPTION OF EMBODIMENTS

Figure 3:
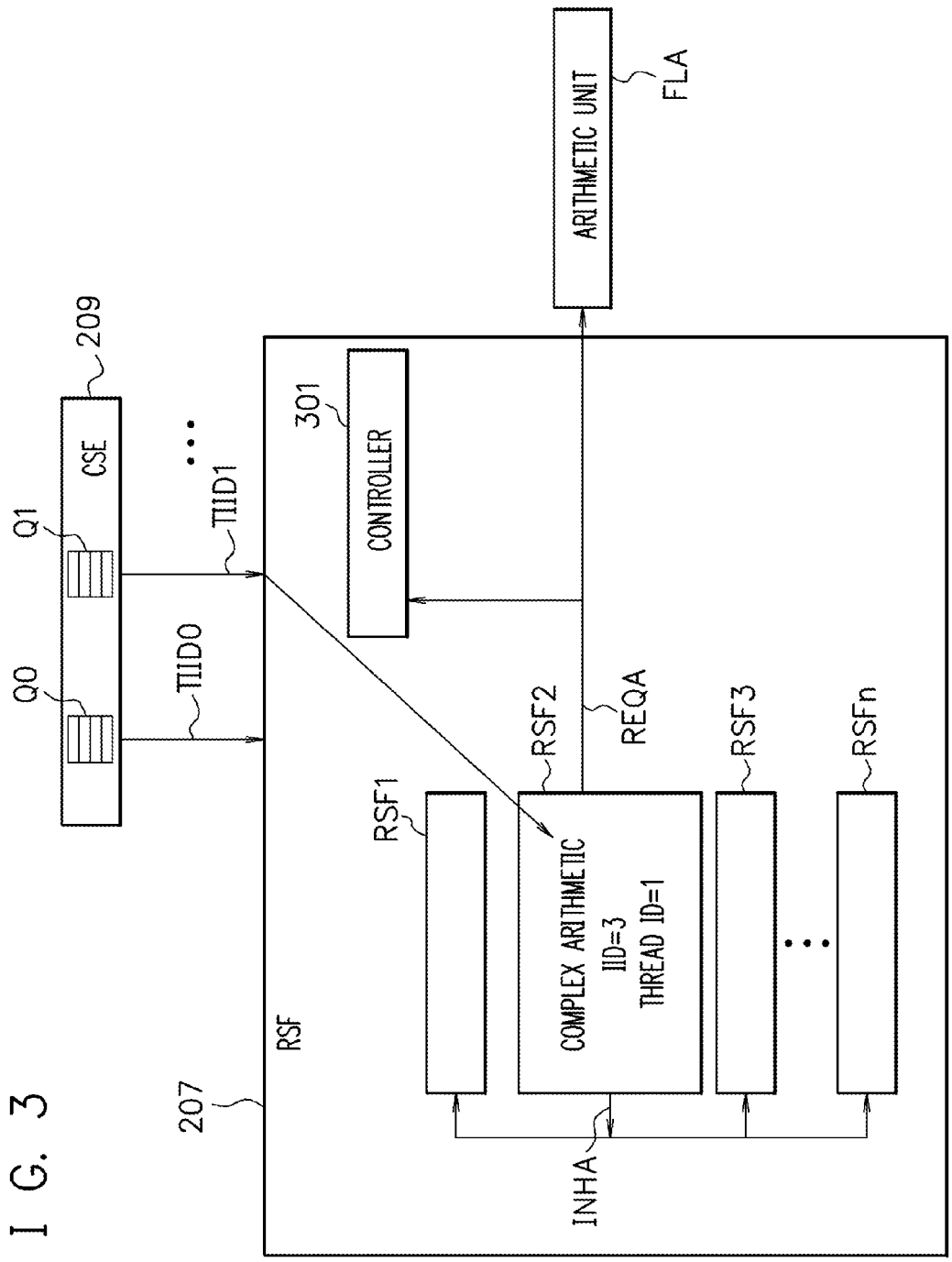
FIG. 3 is a diagram illustrating a configuration example of an RSF, an arithmetic unit, and a CSE in FIG. 2.

FIG. 1 is a diagram illustrating a configuration example of an arithmetic processing system 100 according to this embodiment. The arithmetic processing system 100 is, for example, a server, and includes: a plurality of central processing units (CPUs: Central Processing Units) 101; a plurality of memories 102; and an interconnection controlling unit 103. The plural memories 102 are connected to the plural central processing units 101 respectively. The interconnection controlling unit 103 is connected to the plural central processing units 101 and can input/output data into/from an external device.

FIG. 2 is a diagram illustrating a configuration example of the central processing unit 101 in FIG. 1. The central processing unit 101 is, for example, a superscalar processor, has a simultaneous multithreading (SMT: Simultaneous Multithreading) function, and can execute a plurality of threads simultaneously. In order to fetch an instruction, an instruction fetch address generator 201 selects an instruction address input from a program counter 218, a reservation station for branch instruction (RSBR: Reservation Station for BRanch) 208, or a branch prediction mechanism 204, and issues an instruction fetch request of the selected instruction address to a primary instruction cache memory 202. The primary instruction cache memory 202 outputs an instruction in accordance with the instruction fetch request to an instruction decoder 203. The instruction decoder 203 performs decode processing of the instruction in the order of a program, and issues the instruction. In the program, each instruction is in association with one thread of a plurality of threads. The instruction decoder 203 issues each instruction in association with a thread. The instruction decoder 203 creates, in accordance with the type of the instruction to be decoded, entries necessary for a reservation station for main storage operand address generation (RSA: Reservation Station for Address generate) 205 that controls instruction execution, a reservation station for fixed-point arithmetic (RSE: Reservation Station for Execute) 206, a reservation station for floating-point arithmetic (RSF: Reservation Station for Floating) 207, and the RSBR 208. Further, the instruction decoder 203 creates an entry for a commit stack entry (CSE: Commit Stack Entry) 209 that controls instruction completion with respect to all of decoded instructions. When the entries are created in the RSA 205, the RSE 206, and the RSF 207 with respect to the decoded instruction, an out-of-order execution can be performed by renaming registers corresponding to a fixed-point update buffer 212 and a floating-point update buffer 215. Operand address generators 210A and 210B generate, in accordance with the entry of the RSA 205, an address of an operand, and output the address to a primary data cache memory 211. The primary data cache memory 211 outputs data of the generated operand address to the fixed-point update buffer 212 or the floating-point update buffer 215. Arithmetic units EXA and EXB are fixed-point arithmetic units (second arithmetic units) to perform fixed-point arithmetic in accordance with the entry of the RSE 206. Arithmetic units FLA and FLB are floating-point arithmetic units (first arithmetic units) to perform floating-point arithmetic in accordance with the entry of the RSF 207. Execution results of arithmetic of the arithmetic units EXA and EXB are stored in the fixed-point update buffer 212. Execution results of arithmetic of the arithmetic units FLA and FLB are stored in the floating-point update buffer 215. A storage element 214 is connected to the arithmetic unit FLA. The instructions executed out-of-order from the reservation stations 205 to 208 are completed in the order of the program by the control of the CSE 209, and programmable resources such as a fixed-point register 213, a floating-point register 216, and program counters 217 and 218 are updated with respect only to the completed instruction. The program counter 218 outputs an address of an instruction to be executed currently. The program counter 217 outputs an address next to the address output by the program counter 218. The branch prediction mechanism 204 predicts whether or not a branch instruction is branched, in accordance with the entry of the RSBR 208, and outputs an address of an instruction to be executed next to the instruction fetch address generator 201. Further, the RSBR 208 outputs a correct address to the instruction fetch address generator 201 when the above-described prediction of the branch instruction is decided to be wrong.

The fixed-point update buffer 212 stores therein an undecided execution result of the arithmetic unit EXA or EXB. When execution of the arithmetic unit EXA or EXB is completed, the fixed-point register 213 decides the execution result stored in the fixed-point update buffer 212 to store it therein. The arithmetic unit EXA or EXB executes an instruction using the usable execution result out of the execution results in the fixed-point update buffer 212 or data of the fixed-point register 213.

The floating-point update buffer 215 stores therein an undecided execution result of the arithmetic unit FLA or FLB. When execution of the arithmetic unit FLA or FLB is completed, the floating-point register 216 decides the execution result stored in the floating-point update buffer 215 to store it therein. The arithmetic unit FLA or FLB executes an instruction using the usable execution result out of the execution results in the floating-point update buffer 215 or data of the floating-point register 216. The arithmetic unit FLA can execute all floating-point arithmetic instructions including complex floating-point arithmetic instructions and simple floating-point arithmetic instructions. In contrast to this, the arithmetic unit FLB cannot execute complex floating-point arithmetic instructions but can execute only simple floating-point arithmetic instructions.

FIG. 3 is a diagram illustrating a configuration example of the RSF 207, the arithmetic unit FLA, and the CSE 209 in FIG. 2. The RSF 207 includes: a plurality of entries RSF1 to RSFn; and a controller 301. The plural entries RSF1 to RSFn each can store therein a type of instruction indicating whether or not an instruction is a complex arithmetic instruction, an identifier of an instruction (IID), and an identifier of a thread (ID). The instruction decoder 203, when the decoded instruction is a floating-point arithmetic instruction, outputs a type of instruction indicating whether or not the instruction is a complex arithmetic instruction, an identifier of the decoded instruction (IID), and an identifier of a thread (ID) corresponding to the decoded instruction to the RSF 207. The RSF 207 stores the type of instruction indicating whether or not the instruction is a complex arithmetic instruction, the identifier of the decoded instruction (IID), and the identifier of the thread (ID) corresponding to the decoded instruction in one of the plural entries RSF1 to RSFn. For example, it is stored in the entry RSF2 that the type of the instruction is a complex arithmetic instruction, the identifier of the instruction (IID) is "3," and the identifier of the thread (ID) is "1."

Figure 7A:
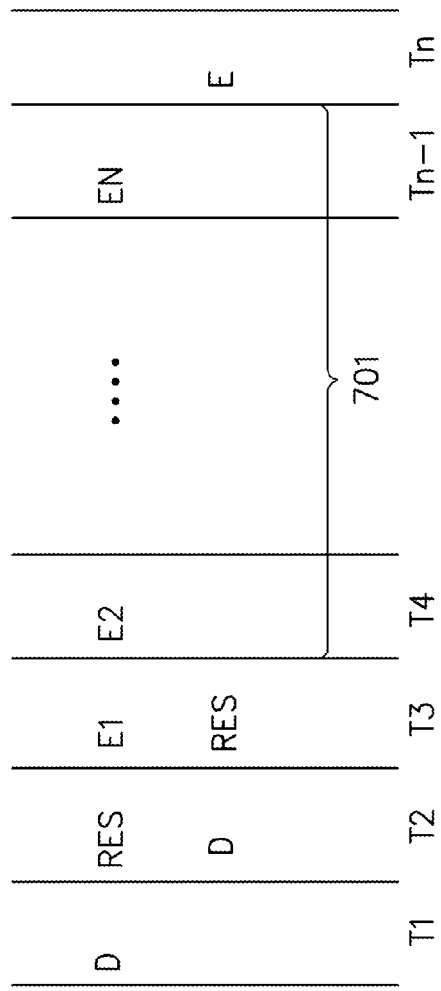
FIG. 7A and FIG. 7B are diagrams each illustrating a processing time of pipeline processing of the central processing unit.
Figure 7B:
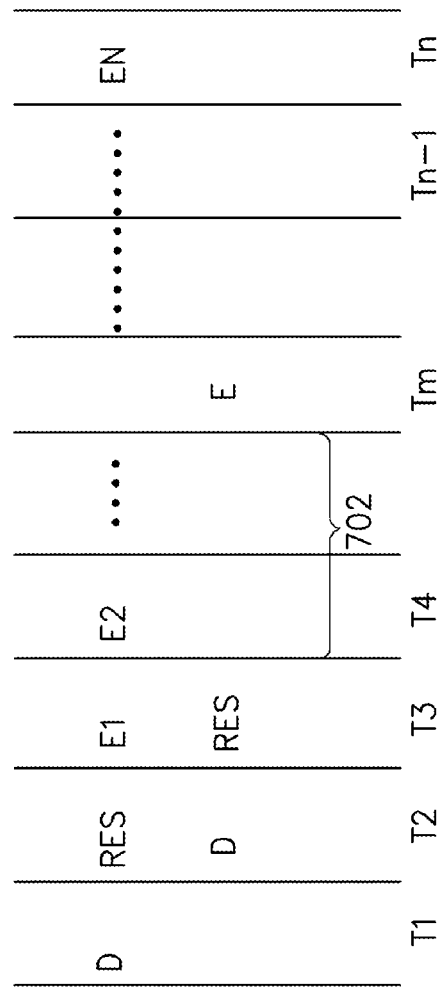

Here, as illustrated in FIG. 7A, the complex arithmetic instruction is an arithmetic instruction that is executed by the arithmetic unit FLA and whose execution cycle numbers E1 to EN are equal to or more than a threshold value. In contrast to this, as illustrated in FIG. 7B, the simple arithmetic instruction (subsequent arithmetic instruction) is an arithmetic instruction that is executed by the arithmetic unit FLA and whose execution cycle number E is less than a threshold value.

The CSE 209 includes queues Q0, Q1, and the like that each store therein an identifier of an instruction (IID) whose execution is not completed out of the instructions decoded by the instruction decoder 203 for each identifier of a thread sequentially. The queues Q0, Q1, and the like store therein identifiers of arithmetic waiting instructions of all the reservation stations 205 to 208. The queue Q0 stores therein an identifier of an instruction (IID) corresponding to the identifier of the thread being "0" sequentially. The queue Q1 stores therein an identifier of an instruction (IID) corresponding to the identifier of the thread being "1" sequentially. The CSE 209 outputs an identifier of the head instruction (identifier of the oldest instruction) TIID0 in the queue Q0 and an identifier of the head instruction (identifier of the oldest instruction) TIID1 in the queue Q1 to the RSF 207.

The entry RSF2, when the type of an instruction stored in the own entry RSF2 is a complex arithmetic instruction, the identifier of the head instruction TIID1 in the queue Q1 corresponding to "1" of the identifier of the thread stored in the own entry RSF2 agrees with "3" of the identifier of the instruction (IID) stored in the own entry RSF2, outputs a request signal REQA and arithmetic instruction information stored in the entry RSF2 to the arithmetic unit FLA and the controller 301 and outputs a use inability signal INHA of the arithmetic unit FLA to the other entries RSF1, and RSF3 to RSFn. Then, the arithmetic unit FLA starts execution of the arithmetic instruction of the entry RSF2.

Incidentally, "3" of the identifier of the instruction (IID) stored in the own entry RSF2 does not necessarily have to agree with the identifier of the head instruction TIID1 in the queue Q1 as described above. That is, it may also be designed that the entry RSF2, when the instruction stored in the entry RSF2 is the oldest uncompleted instruction in the RSF 207 and the instruction stored in the entry RSF2 is a complex arithmetic instruction, outputs the request signal REQA and the arithmetic instruction information stored in the entry RSF2 to the arithmetic unit FLA and outputs the use inability signal INHA of the arithmetic unit FLA to the other entries RSF1, and RSF3 to RSFn. In this case, however, the execution result in the floating-point register 216 is undecided, so that the arithmetic unit FLA determines whether or not the execution result in the floating-point register 216 is usable and executes the arithmetic instruction using only the usable execution result.

In contrast to this, when "3" of the identifier of the instruction (IID) stored in the own entry RSF2 agrees with the identifier of the head instruction TIID1 in the queue Q1 as described above, the execution result in the floating-point register 216 is decided, and therefore there is an advantage that the arithmetic unit FLA can execute the arithmetic instruction using the execution result in the floating-point register 216 without determining whether or not the execution result in the floating-point register 216 is usable.

Here, the entry RSF2, when outputting the request signal REQA and the arithmetic instruction information stored in the entry RSF2 to the arithmetic unit FLA and the controller 301, outputs the use inability signal INHA of the arithmetic unit FLA to the other entries RSF1, and RSF3 to RSFn different from the own entry RSF2. This makes it impossible for the entries RSF1, and RSF3 to RSFn to use the arithmetic unit FLA, and the entry RSF2 uses the arithmetic unit FLA exclusively.

However, since this arithmetic instruction is a complex arithmetic instruction, an arithmetic instruction execution time of the arithmetic unit FLA is long. As a result, when the complex arithmetic instruction corresponding to "1" of the identifier of the thread is executed, the arithmetic instruction corresponding to "0" of the identifier of the thread sometimes turns to a standby state for a long time.

Then, the controller 301 has a timer and starts counting the timer when receiving input of the request signal REQA and when the type of the instruction is a complex arithmetic instruction.

Figure 4:
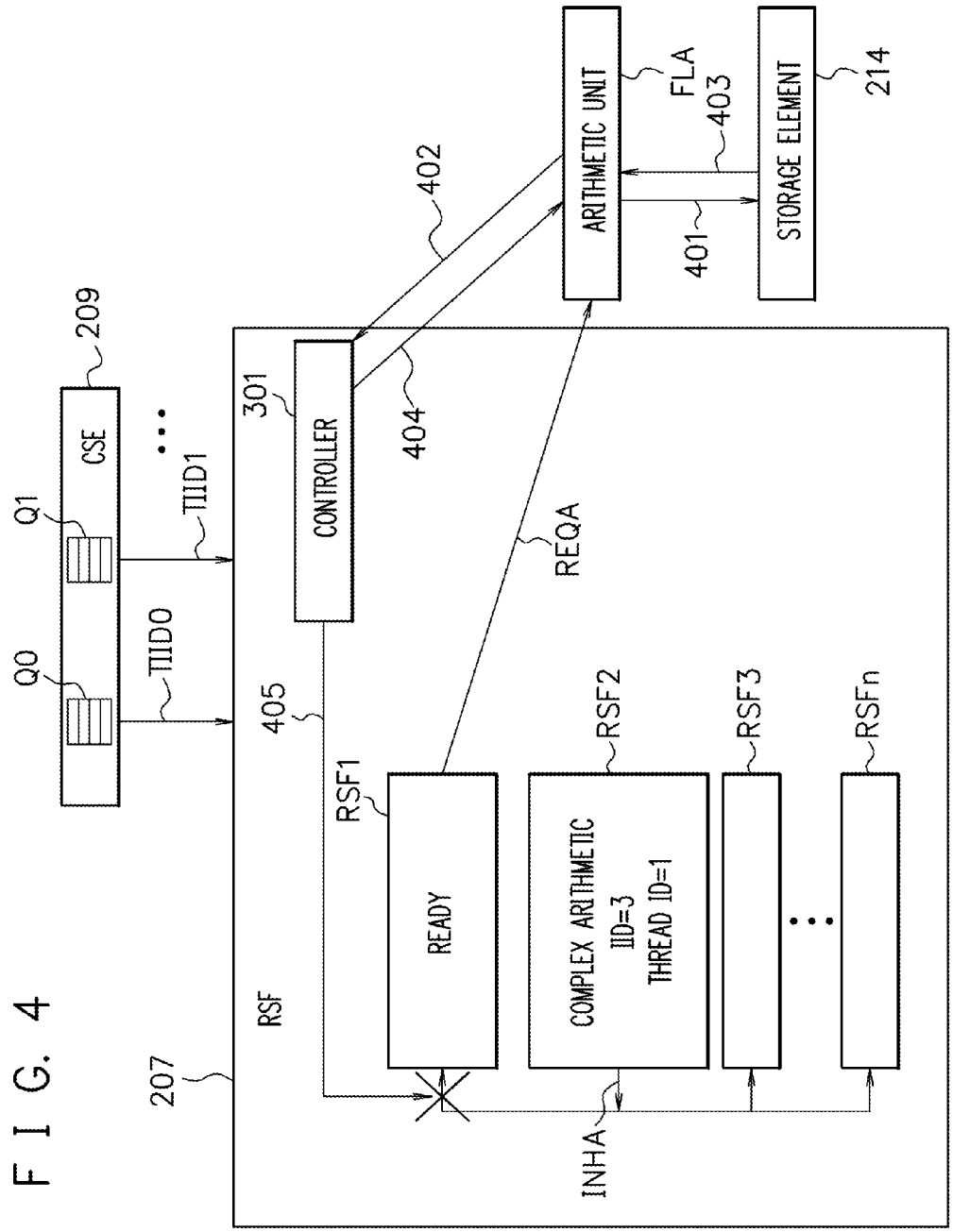
FIG. 4 is a diagram illustrating a processing method of the central processing unit subsequent to FIG. 3.

FIG. 4 is a diagram illustrating a processing method of the central processing unit 101 subsequent to FIG. 3. The controller 301, when the use inability signal INHA of the arithmetic unit FLA is output and then a use inability discontinuation condition is satisfied, outputs a discontinuation signal 404 for discontinuing execution of the arithmetic unit FLA to the arithmetic unit FLA and outputs a discontinuation signal 405 for discontinuing output of the use inability signal INHA.

For example, the above-described use inability discontinuation condition is a condition that as for a count value of the timer in the controller 301, a fixed period of time elapses since the output of the use inability signal INHA of the arithmetic unit FLA and there exists an entry in a ready state that has an identifier of a thread different from "1" of the identifier of the thread in the entry RSF2 among the entries RSF1, and RSF3 to RSFn.

As another example, the above-described use inability discontinuation condition may also be a condition that in the RSF 207, the number of entries that store therein identifiers of threads different from the identifier of the thread stored in the entry RSF2 is a fixed number or more.

For example, the controller 301, when the use inability discontinuation condition is satisfied, selects the entry RSF1 that stores therein an identifier of a thread different from "1" of the identifier of the thread stored in the entry RSF2, stores therein the identifier of the oldest uncompleted instruction (IID) in the RSF 207, and is in a state ready for instruction issuance. Then, the controller 301 outputs the discontinuation signal 405 for discontinuing output of the use inability signal INHA from the entry RSF2 to the entry RSF1 and outputs the discontinuation signal 404 for discontinuing execution of the arithmetic unit FLA to the arithmetic unit FLA. Then, the arithmetic unit FLA discontinues execution of the arithmetic instruction stored in the entry RSF2 and saves a state 401 of the arithmetic unit FLA in the storage element 214. Further, output of the use inability signal INHA from the entry RSF2 to the entry RSF1 is discontinued. Then, the entry RSF1 outputs a request signal REQA and arithmetic instruction information stored in the entry RSF1 to the arithmetic unit FLA. Then, the arithmetic unit FLA executes the arithmetic instruction stored in the entry RSF1, and after completion of the execution, returns to a state 403 saved in the storage element 214 and outputs a discontinuation processing completion signal 402 to the controller 301. Then, the controller 301 completes output of the discontinuation signal 405. Then, output of the use inability signal INHA from the entry RSF2 to the entry RSF1 is restarted. Then, the controller 301 resets the count value of the timer to start counting the timer. Further, the arithmetic unit FLA restarts execution of the arithmetic instruction stored in the entry RSF2.

Figure 5:
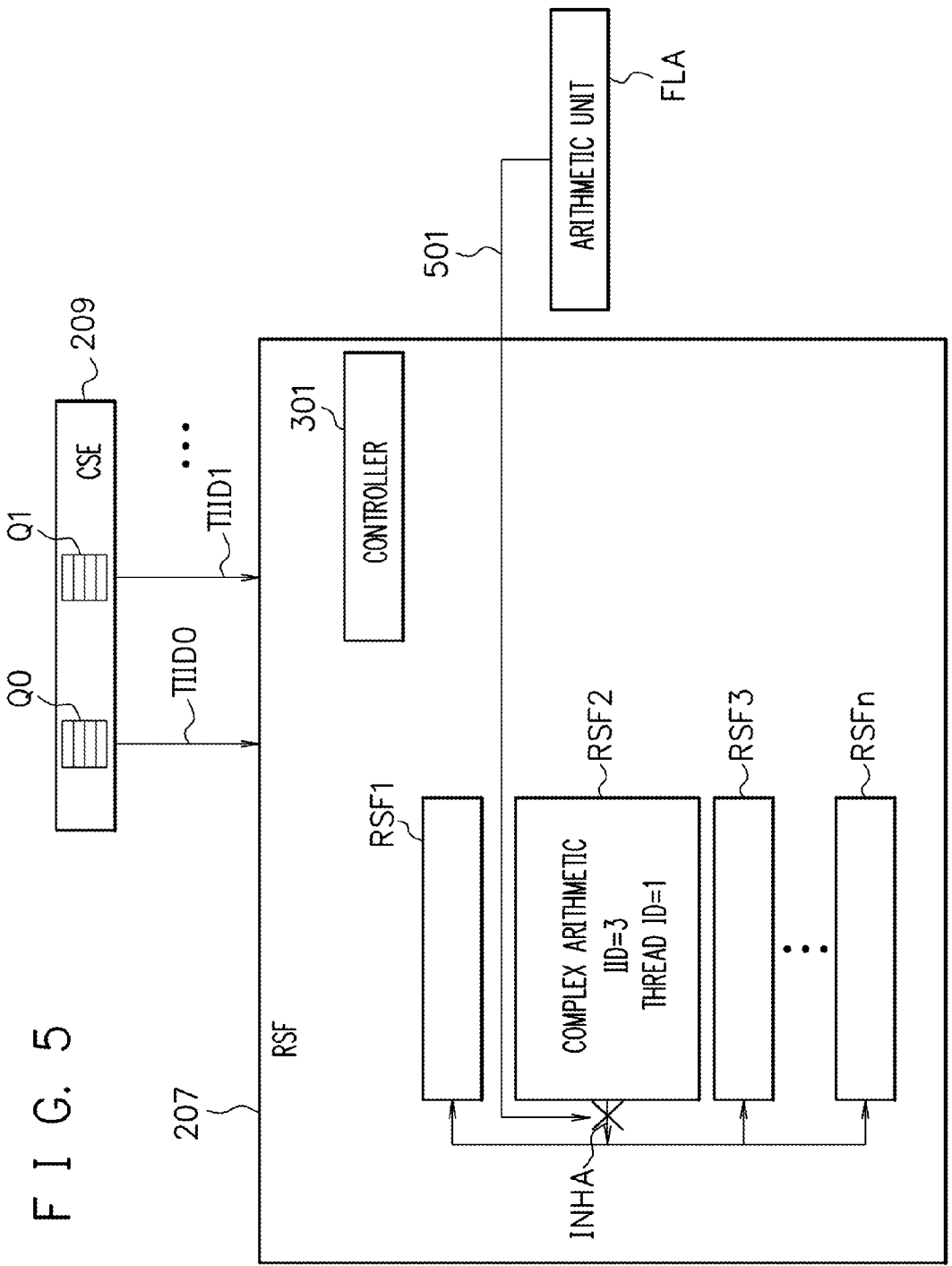
FIG. 5 is a diagram illustrating the processing method of the central processing unit subsequent to FIG. 4.

FIG. 5 is a diagram illustrating the processing method of the central processing unit 101 subsequent to FIG. 4. The entry RSF2, when the arithmetic unit FLA completes execution of the arithmetic instruction of the entry RSF2 and outputs a completion signal 501, completes output of the use inability signal INHA of the arithmetic unit FLA.

Figure 6:
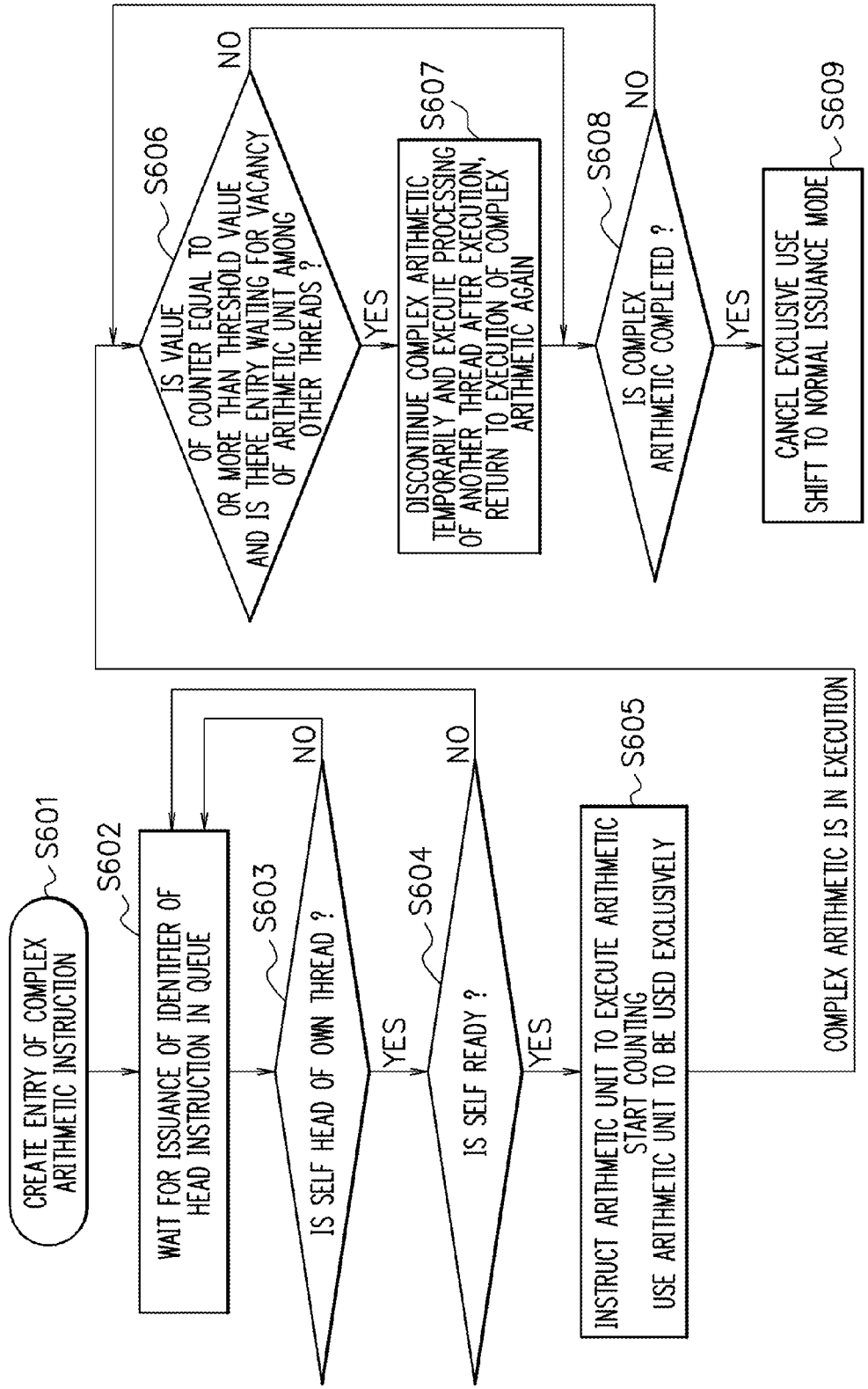
FIG. 6 is a flowchart illustrating the processing method of the central processing unit.

FIG. 6 is a flowchart illustrating the processing method of the central processing unit 101. At Step S601, the RSF 207 creates the entry RSF2 of a complex arithmetic instruction. Next, at Step S602, the entry RSF2 waits for issuance of the identifier of the head instruction TIID0 in the queue Q0, the identifier of the head instruction TIID1 in the queue Q1, or the like. Next, at Step S603, the entry RSF2 determines whether or not the identifier of the instruction (IID) stored in the own entry RSF2 agrees with the identifier of the head instruction TIID1 in the queue Q1 corresponding to "1" of the identifier of the thread stored in the own entry RSF2. When they do not agree with each other, the processing returns to Step S602, and when they agree with each other, the processing proceeds to Step S604. At Step S604, the entry RSF2 determines whether or not the own entry RSF2 has completed a preparation for instruction issuance. When the entry RSF2 has not completed the preparation, the processing returns to Step S602, and when the entry RSF2 has completed the preparation, the processing proceeds to Step S605.

At Step S605, the entry RSF2 outputs the request signal REQA and the arithmetic instruction information to the arithmetic unit FLA, to thereby instruct the arithmetic unit FLA to execute the arithmetic instruction. The controller 301 starts counting the timer. The entry RSF2 outputs the use inability signal INHA to the other entries RSF1, and RSF3 to RSFn, to thereby be able to use the arithmetic unit FLA exclusively. The arithmetic unit FLA starts execution of the complex arithmetic instruction of the entry RSF2.

Next, at Step S606, the controller 301 determines whether or not the use inability discontinuation condition that the value of the timer is equal to or more than a threshold value and there exists an entry waiting for vacancy of the arithmetic unit FLA among the other entries with threads is satisfied. When the use inability discontinuation condition is satisfied, the processing proceeds to Step S607, and when the use inability discontinuation condition is not satisfied, the processing proceeds to Step S608.

At Step S607, the controller 301 outputs the discontinuation signal 404 to the arithmetic unit FLA. Then, the arithmetic unit FLA discontinues execution of the complex arithmetic instruction and saves the state 401 of the arithmetic unit FLA in the storage element 214. The controller 301 selects the entry RSF1 that stores therein an identifier of another thread and stores therein the identifier of the oldest uncompleted instruction in the RSF 207, and performs control to discontinue output of the use inability signal INHA from the entry RSF2 to the entry RSF1. Then, the entry RSF1 outputs the request signal REQA and the arithmetic instruction information to the arithmetic unit FLA. Then, the arithmetic unit FLA executes the arithmetic instruction of the entry RSF1, and after completion of the execution, returns to the state 403 saved in the storage element 214 and outputs the discontinuation processing completion signal 402 to the controller 301. The controller 301 performs control to restart output of the use inability signal INHA from the entry RSF2 to the entry RSF1 and resets the count value of the timer to start counting. The arithmetic unit FLA restarts execution of the complex arithmetic instruction of the entry RSF2.

Next, at Step S608, the arithmetic unit FLA determines whether or not the execution of the complex arithmetic instruction of the entry RSF2 has been completed. When it has not been completed, the processing returns to Step S606, and when it has been completed, the processing proceeds to Step S609.

At Step S609, the arithmetic unit FLA outputs the completion signal 501. Then, the entry RSF2 completes output of the use inability signal INHA and cancels exclusive use of the arithmetic unit FLA to shift to a normal issuance mode.

In the normal issuance mode, the entry RSF2 does not output the use inability signal INHA. Further, the entry RSF2 does not determines whether or not the identifier of the instruction stored in the own entry RSF2 agrees with the identifier of the head instruction THD1 in the queue Q1 corresponding to the identifier of the thread stored in the own entry RSF2. That is, the entry RSF2, when the identifier of the instruction stored in the entry RSF2 is the identifier of the oldest uncompleted instruction in the RSF 207, outputs the arithmetic instruction information stored in the entry RSF2 and the request signal REQA to the arithmetic unit FLA and does not output the use inability signal INHA.

FIGS. 7A and 7B are diagrams each illustrating a processing time of pipeline processing of the central processing unit 101. The complex arithmetic is an arithmetic of a complex floating-point arithmetic instruction of the entry RSF2, and the identifier of the thread is "1." The subsequent arithmetic is an arithmetic of a simple floating-point arithmetic instruction of the entry RSF1, and the identifier of the thread is "0."

FIG. 7A illustrates the case where the controller 301 does not output the discontinuation signal 405. In a first cycle T1, the instruction decoder 203 performs decoding of the complex arithmetic instruction. In a second cycle T2, the RSF 207 creates the entry RSF2 of the complex arithmetic instruction, and the instruction decoder 203 performs decoding of the subsequent instruction. From a third cycle T3 to an nth–1 cycle Tn–1, the arithmetic unit FLA executes the complex arithmetic instruction of the entry RSF2. The complex arithmetic instruction is a Montgomery arithmetic, for example, and its execution time is long. Further, in the third cycle T3, the RSF 207 creates the entry RSF1 of the subsequent arithmetic instruction. From the third cycle T3 to the nth–1 cycle Tn–1, the arithmetic unit FLA is in execution of the complex arithmetic instruction, so that the subsequent arithmetic instruction turns to a standby state. After completion of the execution of the complex arithmetic instruction, in an nth cycle Tn, the arithmetic unit FLA executes the subsequent arithmetic instruction. A standby time 701 of the subsequent arithmetic instruction becomes a long time, bringing about a problem that quality of service (QoS) of the identifier of the thread being "0" decreases significantly. This embodiment in FIG. 7B solves this problem.

FIG. 7B illustrates the case where the controller 301 outputs the discontinuation signal 405 as illustrated in FIG. 3 to FIG. 5. The processing from the first cycle T1 before an mth cycle Tm is the same as that in FIG. 7A. In the mth cycle Tm after the fourth cycle T4, by the discontinuation signals 404 and 405 from the controller 301, the arithmetic unit FLA discontinues execution of the complex arithmetic instruction of the entry RSF2 and executes the subsequent arithmetic instruction of the entry RSF1. After completion of the execution, the arithmetic unit FLA restarts execution of the complex arithmetic instruction of the entry RSF2. In this case, a standby time 702 of the subsequent arithmetic instruction becomes shorter than the standby time 701 in FIG. 7A, resulting in that it is possible to prevent the decrease in the quality of service (QoS) of the identifier of the thread being "0."

Note that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

By discontinuing output of a use inability signal of a first arithmetic unit, a standby time of an instruction of a thread in a second entry can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device configured to execute instructions of a plurality of threads, the arithmetic processing device comprising:
   an instruction decoder configured to decode an instruction, to thereby output the decoded instruction and an identifier of a thread corresponding to the decoded instruction;
   a reservation station configured to include a plurality of entries and store the instruction decoded by the instruction decoder and the identifier of the thread corresponding to the decoded instruction in one of the plurality of entries; and
   a first arithmetic unit configured to execute an instruction stored in the reservation station, wherein
   a first entry among the plurality of entries, when outputting an instruction stored in the first entry to the first arithmetic unit and when an execution cycle number of the instruction stored in the first entry is equal to or more than a threshold value, outputs a use inability signal of the first arithmetic unit to a second entry different from the first entry,
   the reservation station comprises a controller configured to, when the use inability signal of the first arithmetic unit is output and then a use inability discontinuation condition is satisfied, perform control to discontinue execution of the first arithmetic unit, store a state of the first arithmetic unit in a storage element, and discontinue output of the use inability signal of the first arithmetic unit,
   the second entry, when an identifier of a thread stored in the second entry is different from the identifier of the thread stored in the first entry, an instruction stored in the second entry is the oldest uncompleted instruction in the reservation station, and output of the use inability signal of the first arithmetic unit is discontinued, outputs the instruction stored in the second entry to the first arithmetic unit, and
   the first arithmetic unit, when completing execution of the instruction output from the second entry, returns to a state stored in the storage element and restarts execution of the instruction of the first entry.

2. The arithmetic processing device according to claim 1, wherein
   the use inability discontinuation condition is a condition that a fixed period of time elapses since the output of the use inability signal of the first arithmetic unit.

3. The arithmetic processing device according to claim 1, wherein
   the use inability discontinuation condition is a condition that the number of entries that store therein identifiers of threads different from the identifier of the thread stored in the first entry is equal to or more than a fixed number.

4. The arithmetic processing device according to claim 1, wherein
   the first arithmetic unit outputs a completion signal to the controller when completing execution of the instruction output from the second entry, and
   the controller, when receiving input of the completion signal, makes the first entry restart output of the use inability signal of the first arithmetic unit.

5. The arithmetic processing device according to claim 4, wherein
   the first entry, when the first arithmetic unit completes execution of the instruction of the first entry, completes output of the use inability signal of the first arithmetic unit.

6. The arithmetic processing device according to claim 1, wherein
   the first entry, when the instruction stored in the first entry is the oldest uncompleted instruction in the reservation station and the execution cycle number of the instruction stored in the first entry is equal to or more than a threshold value, outputs the instruction stored in the first entry to the first arithmetic unit and outputs the use inability signal of the first arithmetic unit to the second entry.

7. The arithmetic processing device according to claim 1, further comprising:
   a second arithmetic unit configured to execute an instruction of a type different from an instruction to be executed by the first arithmetic unit among instructions decoded by the instruction decoder; and
   a queue configured to sequentially store therein an identifier of an instruction whose execution is not completed among the instructions decoded by the instruction decoder for each identifier of a thread, wherein
   the reservation station does not store therein an instruction to be executed by the second arithmetic unit but stores therein an instruction to be executed by the first arithmetic unit,
   the queue stores therein identifiers of instructions to be executed by the first and second arithmetic units, and
   the first entry, when an identifier of the head instruction in the queue corresponding to the identifier of the thread stored in the first entry indicates the instruction stored in the first entry and the execution cycle number of the instruction stored in the first entry is equal to or more than a threshold value, outputs the instruction stored in the first entry to the first arithmetic unit and outputs the use inability signal of the first arithmetic unit to the second entry.

8. The arithmetic processing device according to claim 7, further comprising:
   a buffer configured to store therein an undecided execution result of the first arithmetic unit; and
   a register configured to, after completion of execution by the first arithmetic unit, decide the execution result stored in the buffer to store therein the decided execution result, wherein
   the first arithmetic unit uses a usable execution result among execution results in the buffer to execute the instruction.

9. The arithmetic processing device according to claim 1, wherein
   the first arithmetic unit a floating-point arithmetic unit.

10. A processing method of an arithmetic processing device configured to execute instructions of a plurality of threads, the processing method comprising:
    decoding an instruction by an instruction decoder, to thereby output the decoded instruction and an identifier of a thread corresponding to the decoded instruction;
    storing the instruction decoded by the instruction decoder and the identifier of the thread corresponding to the decoded instruction in one of a plurality of entries of a reservation station; and
    executing an instruction stored in the reservation station by a first arithmetic unit, wherein
    a first entry among the plurality of entries, when outputting an instruction stored in the first entry to the first arithmetic unit and when an execution cycle number of the instruction stored in the first entry is equal to or more than a threshold value, outputs a use inability signal of the first arithmetic unit to a second entry different from the first entry, the reservation station comprises a controller configured to, when the use inability signal of the first arithmetic unit is output and then a use inability discontinuation condition is satisfied, perform control to discontinue execution of the first arithmetic unit, store a state of the first arithmetic unit in a storage element, and discontinue output of the use inability signal of the first arithmetic unit, the second entry, when an identifier of a thread stored in the second entry is different from the identifier of the thread stored in the first entry, an instruction stored in the second entry is the oldest uncompleted instruction in the reservation station, and output of the use inability signal of the first arithmetic unit is discontinued, outputs the instruction stored in the second entry to the first arithmetic unit, and the first arithmetic unit, when completing execution of the instruction output from the second entry, returns to a state stored in the storage element and restarts execution of the instruction of the first entry.

* * * * *